UNITED STATES PATENT OFFICE.

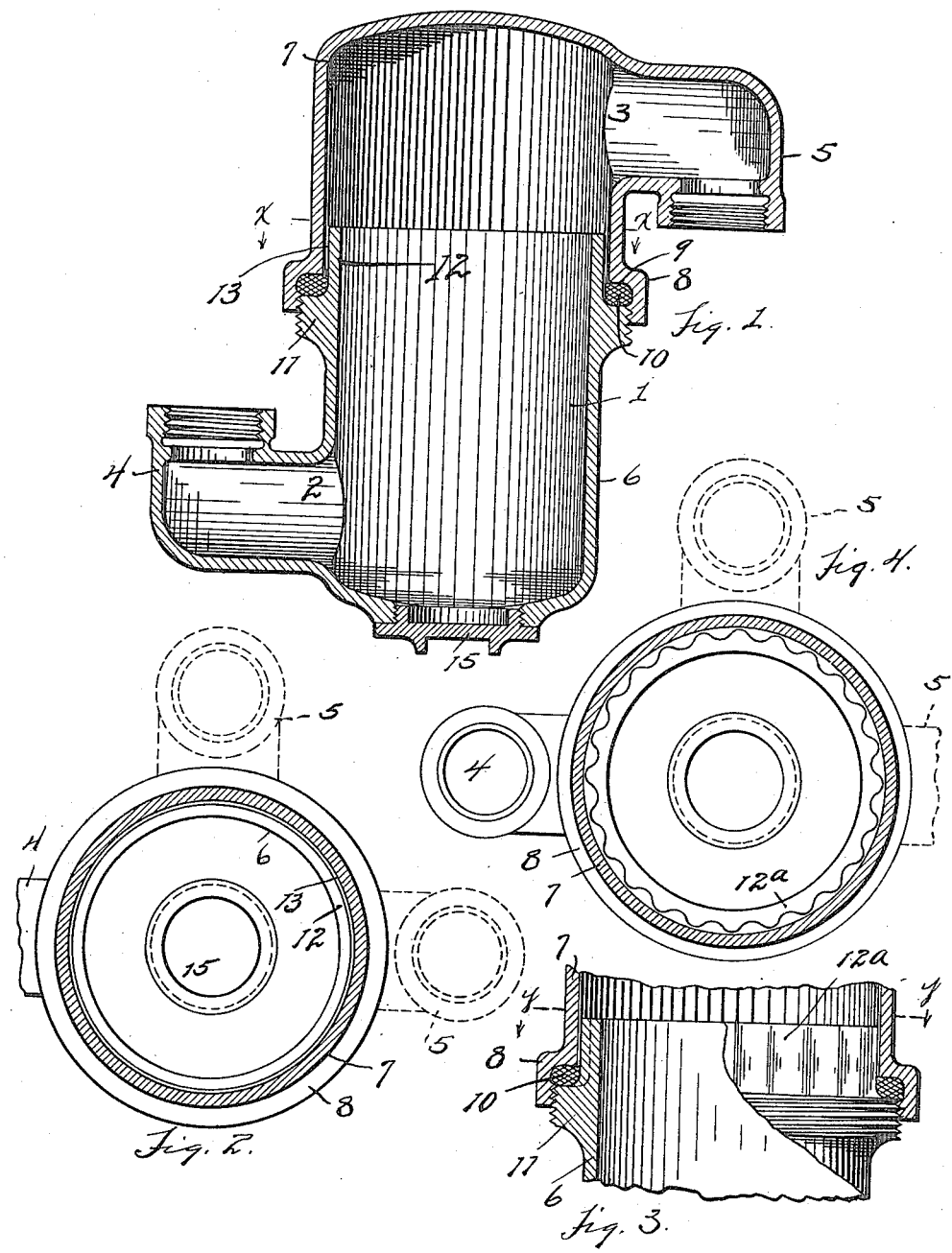

EDWARD W. N. BOOSEY, OF DETROIT, MICHIGAN.

TRAP.

1,220,818. Specification of Letters Patent. Patented Mar. 27, 1917.

Application filed March 21, 1913. Serial No. 755,891.

*To all whom it may concern:*

Be it known that I, EDWARD W. N. BOOSEY, a citizen of the United States, residing at Detroit, county of Wayne, State of Michigan, have invented a certain new and useful Improvement in Traps, and declare the following to be a full, clear, and exact description of the same, such as will enable others skilled in the art to which it pertains to make and use the same, reference being had to the accompanying drawings, which form a part of this specification.

This invention relates to traps adaptable for use with bath tubs, wash basins, etc., of such form that the foreign matter may pass freely therethrough, and of such construction as to be readily secured to both the inlet and outlet pipes irrespective of their relative position.

In traps formed of a single piece in which the positions of the inlet and outlet are relatively fixed, it frequently happens that one or the other of the pipes to be connected therewith must be formed with a bend in order to make the proper connection with the trap, and as it is desirable that these pipes shall have as few bends as is possible, the invention shown comprises a trap in which the relative position of the inlet and outlet connections may be altered to agree with the positions of the inlet and outlet pipes. The invention, therefore, consists in certain peculiarities of construction whereby these objects may be accomplished as hereinafter more fully described and claimed and shown in the accompanying drawings in which—

Figure 1 is a vertical section of a trap embodying my invention.

Fig. 2 is a section on line $x$—$x$ of Fig. 1.

Fig. 3 shows an alternative form of the structure.

Fig. 4 is a section on line $y$—$y$ of Fig. 3.

Similar characters refer to similar parts throughout the drawings and specification.

The trap is of that general type in which the seal chamber 1 is formed of a cylindrical shell having an inlet 2 at or near the bottom thereof and an outlet 3 at or near the top in which there are no internal projecting parts against or about which foreign matter may lodge and clog the trap. The inlet 2 is provided with an upturned pipe-receiving extension 4, and the outlet 3 is provided with a like formed extension 5 with which the inlet and outlet pipes connect respectively.

The seal chamber 1 is formed of two substantially like parts 6 and 7. The upper part 7, with which the extension 5 is integrally formed, is provided with an annular, internally threaded, flange 8 of greater diameter than the body of said part providing a seat 9 for a soft packing 10, and the lower part 6 is provided with an annular, externally threaded, ring 11 to engage the flange 8 of the upper part 7. The packing 10 is situated between this ring on the part 6 and the seat on the part 7. The body 6 is provided with a portion 12 extending beyond said threaded ring portion 11 having the same internal diameter as the body portion 6, and the external diameter of which is somewhat less than the internal diameter of the portion 7 within which it extends, thus forming an interstice 13 between the inner face of the wall of the upper part 7 and the outer face of the extension 12.

This provision of an interstice, as stated, enables the soft packing 10, when compressed by screwing the lower part 6 into the upper part 7, to be forced up into said interstice, whereby the point at which the two parts become seated is not fixed, and allows the two parts to be turned one relative to the other one or more complete turns after the packing has been so compressed that no leakage may occur.

The packing 10 may be of any soft material adaptable for the purpose but is preferably formed of wicking and putty as is commonly used by plumbers in the packing of joints of this nature, and which may be readily forced into the interstice in the manner stated.

An alternative form of the extension is shown at 12ᵃ, in Figs. 3 and 4, in which form of the device the outer surface of the extension is longitudinally grooved, the ribs between the grooves quite closely engaging the inner surface of the wall of the portion 7. The packing may be forced into the grooves by screwing one part into the other which will cut or break the forced out part of the packing into small particles and these will readily wash out of the trap when flushed, whereas, in the form shown in Figs.

1 and 2, a portion of the packing of ring like shape might be forced beyond the end of the extension and possibly clog the outlet.

As shown in Fig. 1, the lower part of the trap is provided with a clean-out opening closed by the plug 15, but in some cases, especially if the trap necessarily rests near or upon the floor, this closable opening may be correspondingly positioned in the part 7 or upon the side of either of the two parts as may be found desirable.

It is to be noted that the part 12 or 12ª is formed on that portion of the trap provided with the inlet 2 and the direction of flow of fluid through the trap tends to force all matter away from the end of the portion 12, whereas if the flow were in the reverse direction matter might lodge against the end of this portion 12.

This method of uniting two similar parts in a plumbing system may be applied to other portions of the system than the trap, for instance, a pipe line into which other pipes lead, and if two joints of the pipeline be united in the manner shown, the threaded openings therein for the connection of branch pipes may be so turned as to meet such pipes without the necessity of making bends therein.

Having thus briefly described my invention, what I claim is—

1. A joint between the two unitable parts each having a lateral extension for a pipe connection therewith comprising an internally threaded portion forming a terminal of one of said parts greater in diameter than the body of said part, an externally threaded portion on the other of said parts for engagement with the first named part, the two parts being formed to provide an annular channel between the assembled parts, the said last named part having a portion extending beyond the threaded part the exterior surface of which is corrugated and less in outside diameter than the internal diameter of the part into which it extends providing a space between the parts when assembled communicating with the annular channel, and a compressible packing in the annular channel, the interstice providing a relief space for the packing to allow the parts to be relatively turned to accommodate the pipe connections after the joint has been made fluid tight.

2. In plumbing, a joint between two separable parts each provided with a lateral extension providing for a pipe connection therewith comprising, an extension on one of said parts adapted to be positioned within the other part and spaced from the wall thereof, the outer surface of the extension being roughened or corrugated, and a compressible packing between the parts adapted to be forced into the space whereby the lateral extensions may be relatively positioned by a rotation of the parts after the joint has been made fluid tight.

3. A joint between two separable parts comprising a longitudinally grooved end on one of said parts extending into the other part, and a compressible packing between said parts adapted to be forced into said grooves.

4. A joint between two separable parts comprising an end upon one of the parts adapted to extend into the other part beyond the plane of the joint and spaced from the wall thereof, the outer surface of the extension being creased or grooved, a packing space between the parts in communication with the space between the said extension and surrounding wall, and a compressible packing in said packing space, the grooves or creases serving to break up the packing forced into the space by a setting up of the joint.

5. A joint between two separable parts comprising a longitudinally grooved end upon one of said parts extending into the other part, a packing space between said parts in communication with the grooves, and a compressible packing in said packing space.

In testimony whereof, I sign this specification in the presence of two witnesses.

EDWARD W. N. BOOSEY.

Witnesses:
RICHARD ALSPAS,
CHARLES E. WISNER.

Copies of this patent may be obtained for five cents each, by addressing the "Commissioner of Patents, Washington, D. C."